UNITED STATES PATENT OFFICE.

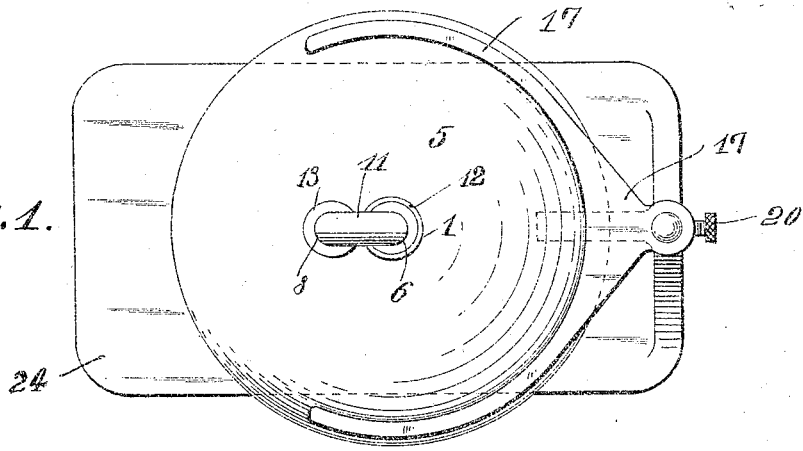
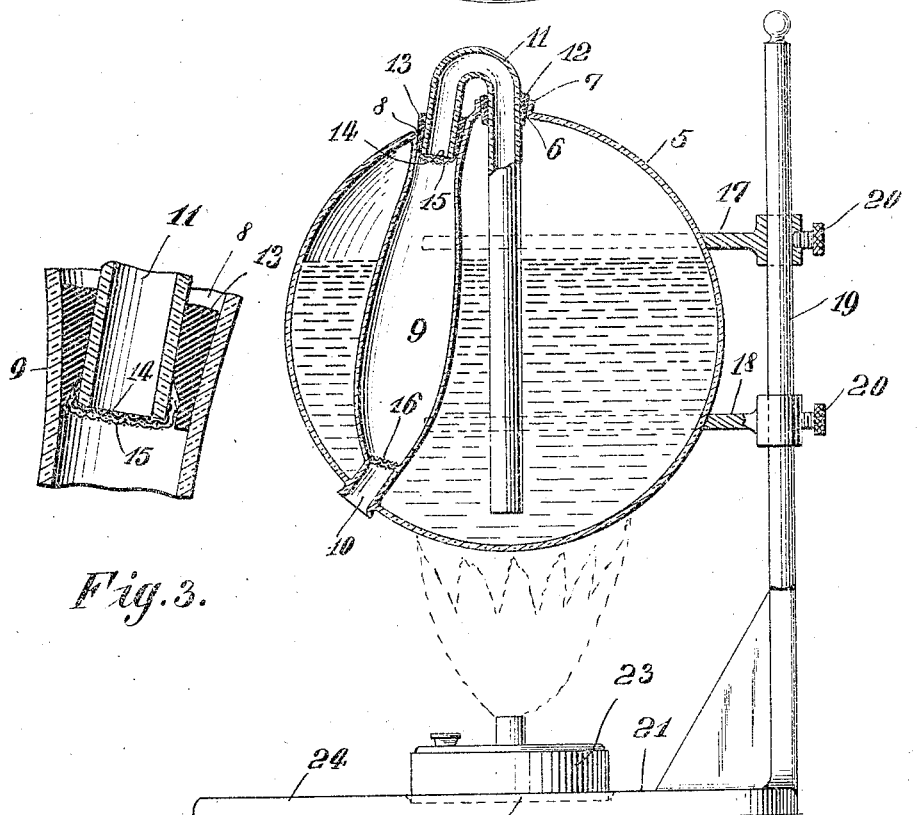

STEFANO BATTILANI, OF NEW YORK, N. Y.

COFFEE-PERCOLATOR.

1,211,910.  Specification of Letters Patent.  Patented Jan. 9, 1917.

Application filed June 8, 1915. Serial No. 32,986.

*To all whom it may concern:*

Be it known that I, STEFANO BATTILANI, a subject of the King of Italy, residing at New York, in the county of New York and State of New York, have invented new and useful Improvements in Coffee-Percolators, of which the following is a specification.

My invention relates to a coffee percolator and has as its object to provide a simple, handy device of this character, adapted for use on a table, to prepare a few cups of coffee quickly.

Reference will now be had to the accompanying drawing, in which:

Figure 1 is a plan view, and Fig. 2 a partly sectional, partly elevational view of my device. Fig. 3 is a sectional view of a part of my device, on an enlarged scale.

Referring more particularly to the drawing, 5 is a glass balloon having, at its top, a circular opening 6 provided with an upwardly widening rim 7. Another opening 8 is provided near the first one, forming the inlet to a compartment 9 formed inside of the balloon 5, integrally therewith, but hermetically closed from the rest of the space contained therein. The compartment 9 has an outlet 10 at its bottom, piercing the balloon 5. A siphon tube 11 has one end inserted into the balloon through the opening 6, which end reaches nearly to the bottom of the balloon, and its other end inserted into the inlet opening 8. Rubber rings 12 and 13 are tightly drawn over the portions of the siphon tube 11 which contact with the orifices 6 and 8, respectively, said rings being cylindrical at the inside and conical at the outside, so that by passing the siphon tube 11 well into the orifices 6 and 8, they will constitute an airtight packing.

A wire screen 14 and a filter 15 are provided over the end of the siphon tube 11 and maintained there by tucking their edges between the tube and the rubber ring 13. A similar screen and filter 16 are loosely placed over the bottom opening or outlet 10 of the compartment 9.

The balloon 5 is held by brackets 17 and 18, slidably mounted on a vertical pedestal 19 and adjustable thereon at various heights by means of set screws 20. The pedestal 19 is mounted on a base 21, having a depression 22 formed therein, into which a heater 23 may be placed, and a projection 24 on which a cup or other receptacle may be placed right under the outlet 10.

The operation of my device is as follows: The siphon 11 has to be removed from the balloon and the latter filled with the required quantity of water, for instance two or three cups full. The proportion of water and air space left in the balloon must, however, be such that no considerable quantity of the former may be forced out by the expansion of the latter, or applying heat to it, before its temperature reaches the boiling point. A proportionate quantity of ground coffee is poured into the compartment 9 through the inlet 8. The siphon is then inserted tightly as shown in the drawing into the orifices 6 and 8 and the heater lighted. The air contained in the balloon over the water will soon expand and force the latter through the siphon into the compartment 9 where it will pervade the ground coffee and extract therefrom the ingredients necessary for producing the black coffee. The heat produced in the compartment 9 by the water surrounding it will materially help to quicken this process and to render it thoroughly effective. Thus in a comparatively short time a strong and aromatic black coffee will be produced and filtering through the screen and filter 16, drop into a receptacle placed under the outlet 10. The screen and filter 14 and 15 prevent any particles of ground coffee floating over into the balloon 5.

It is understood that while I have thus shown and described the preferred form of embodiment of my invention, I do not want to be limited to its mechanical details, but may resort to such modifications and alterations as come within the scope of the claims hereunto appended.

I claim:

1. A coffee percolator comprising, in combination, a glass balloon having a circular opening at its top, a separate compartment formed inside of said glass balloon, integrally therewith, hermetically divided therefrom, having an inlet from and an outlet to the outside, near the top and bottom of said balloon, respectively, a siphon tube having one end removably inserted into said top opening of the balloon and reaching nearly to its bottom, and its other end inserted into the inlet opening of said separate compartment, air tight packing around said siphon tube at said top and inlet openings, and screens provided in said inlet and outlet.

2. A coffee percolator comprising, in combination, a base, a pedestal mounted on said base, a globular container having separate compartments for water and coffee, means of communication between said separate compartments and an outlet from the compartment for coffee, means adjustable on said pedestal for maintaining thereon said globular container in any desired position, means in said base for supporting therein a heater adapted to heat the contents of said container and means for supporting thereon a receptacle under the said outlet.

STEFANO BATTILANI.

Witnesses:
 WM. E. WERNER,
 ALADAR HAMBURGER.